US010766231B2

(12) United States Patent
Rolland et al.

(10) Patent No.: US 10,766,231 B2
(45) Date of Patent: Sep. 8, 2020

(54) PRINTABLE PROTECTIVE LAYER

(71) Applicant: PERFORMANCE MATERIALS NA, INC., Midland, MI (US)

(72) Inventors: Loic Pierre Rolland, Divonne les Bains (FR); Aurelien Barrois, Thoiry (FR)

(73) Assignee: PERFORMANCE MATERIALS NA, INC., Midland, MI (US)

( * ) Notice: Subject to any disclaimer, the term of this patent is extended or adjusted under 35 U.S.C. 154(b) by 189 days.

(21) Appl. No.: 14/438,291

(22) PCT Filed: Oct. 25, 2013

(86) PCT No.: PCT/US2013/066745
§ 371 (c)(1),
(2) Date: Apr. 24, 2015

(87) PCT Pub. No.: WO2014/066722
PCT Pub. Date: May 1, 2014

(65) Prior Publication Data
US 2015/0266278 A1   Sep. 24, 2015

Related U.S. Application Data

(60) Provisional application No. 61/718,453, filed on Oct. 25, 2012.

(51) Int. Cl.
| | |
|---|---|
| *B32B 27/08* | (2006.01) |
| *B32B 27/16* | (2006.01) |
| *B32B 27/34* | (2006.01) |
| *B32B 27/32* | (2006.01) |
| *A63C 5/00* | (2006.01) |
| *B32B 27/28* | (2006.01) |
| *B32B 37/18* | (2006.01) |
| *B32B 38/00* | (2006.01) |

(52) U.S. Cl.
CPC ............. *B32B 27/08* (2013.01); *A63C 5/003* (2013.01); *B32B 27/16* (2013.01); *B32B 27/28* (2013.01); *B32B 27/32* (2013.01); *B32B 27/34* (2013.01); *B32B 37/182* (2013.01); *B32B 38/0004* (2013.01); *B32B 38/145* (2013.01); *B32B 2307/584* (2013.01); *B32B 2307/75* (2013.01); *B32B 2323/04* (2013.01); *B32B 2333/00* (2013.01); *B32B 2451/00* (2013.01); *B32B 2605/00* (2013.01); *Y10T 428/31746* (2015.04); *Y10T 428/31757* (2015.04)

(58) Field of Classification Search
CPC . C08L 77/00; B29B 17/0042; B29C 37/0025; B29L 2009/00; B32B 27/32
See application file for complete search history.

(56) References Cited

U.S. PATENT DOCUMENTS

| | | | |
|---|---|---|---|
| 3,264,272 A | 8/1966 | Rees | |
| 4,606,922 A | 8/1986 | Schirmer | |
| 4,857,408 A * | 8/1989 | Vicik | ...................... B32B 27/08 428/474.4 |
| 4,861,654 A * | 8/1989 | Glover | .................... B32B 27/34 428/35.2 |
| 5,032,139 A | 7/1991 | Recher et al. | |
| 5,891,973 A * | 4/1999 | Sullivan | ............. A63B 37/0003 526/240 |
| 8,119,235 B1 | 2/2012 | Vogel et al. | |
| 2002/0055006 A1 | 5/2002 | Vogel et al. | |
| 2005/0020762 A1 | 1/2005 | Chou et al. | |
| 2006/0099436 A1* | 5/2006 | Schwark | .................. B32B 27/08 428/474.4 |
| 2008/0090059 A1 | 4/2008 | Rolland | |
| 2008/0213552 A1 | 9/2008 | Hager et al. | |
| 2011/0020573 A1* | 1/2011 | Chou | .................. C08L 23/0869 428/36.1 |

FOREIGN PATENT DOCUMENTS

| | | | |
|---|---|---|---|
| JP | 58-205765 A | 11/1983 | |
| JP | 7-204311 A | 8/1995 | |
| JP | 10-52891 A | 2/1998 | |

OTHER PUBLICATIONS

PCT International Search Report and Written Opinion for International Application No. PCT/US2013/066745, dated Jan. 23, 2014.
JP58-205765A Machine Translation.
JP7-204311 Abstract.
JP10-52891 Abstract.

* cited by examiner

*Primary Examiner* — Gregory Listvoyb

(57) ABSTRACT

Disclosed is a multilayer film comprising a first surface layer comprising a cross-linked, partially neutralized copolymer of ethylene and one or more $\alpha,\beta$-unsaturated $C_3$ to $C_8$ carboxylic acid, and a second surface layer comprising a polyamide; a use of such multilayer film for, for example, decorating a substrate such as for example a ski, snowboard or skate board; as well as a ski comprising such coextruded multilayer film. Also disclosed is a process for decorating a substrate comprising coextruding a multilayer film comprising the first surface layer and the second surface layer comprising a polyamide; irradiating the coextruded multilayer film to cross-link the film; printing a decorative element on the second surface layer comprising a polyamide; cutting the multilayer film; contacting the second surface layer of the multilayer film with a surface to be decorated on a substrate; laminating, e.g., by heat, the multilayer film to the surface to be decorated.

9 Claims, No Drawings

PRINTABLE PROTECTIVE LAYER

The present invention relates to printable protective layers for use in, for example, the manufacture of winter sport articles such as snowboards and skis.

BACKGROUND OF THE INVENTION

As recreational winter activities such as skiing and snowboarding become more and more popular, prospective customers not only demand high-performance, but also aesthetically pleasing skis and snowboards sporting extravagant drawings.

A typical ski or snowboard is a layered structure, where the different layers of material are combined to achieve the desired combination between flex and rigidity. The most common type of construction is the so-called "cap" construction, in which the outer surface of the ski or snowboard can be subdivided into two parts: the gliding surface that is in contact with the snow, and the "cap" that covers the remaining top and side surfaces of the ski or snowboard.

The cap is generally made of glass fiber impregnated with epoxy resin, and functions as an essential structural element of the ski or snowboard.

However, the cap is also coated with a printable layer displaying colorful and intricate graphics to make the ski or snowboard more esthetically pleasing to a prospective buyer.

Such printable layers are generally engineered to be printable by sublimation printing, and while such layers have good ink reception properties, they are mostly made of materials that wear, scuff and scratch easily. A preferred material used in sublimation printable layers is transparent or pigment-filled polyamide, which however is easily worn away.

Thus, such printable layers require transparent protective layers which prevent the wear of the printable layer, and which also have good scratch resistance to reduce the tarnishing of the usually high-gloss transparent protective layers.

U.S. Pat. No. 5,032,139 discloses a cover sheet having two layers for use in a process for decorating an article such as a ski using a sublimation printing. The cover sheet comprises two superposed layers of plastic material, one of which is substantially transparent while the other is opaque. The opaque layer can receive a sublimable coloring agent and is applied to the article. However, such cover sheet is easily worn away, resulting in an unwanted esthetic deterioration of the coated article.

Thus, there is a need to provide for protective, printable layers that allow a reduction in the number of steps to be performed in the decorating process, and which can directly be heat-laminated to a substrate such as a ski, snowboard or skateboard to be decorated, irrespective of the degree of crosslinking of the layers, while at the same time providing the best possible scratch and scuff protection of the printed layer.

SUMMARY OF THE INVENTION

The invention provides for a multilayer film comprising, consisting essentially of, or consisting of, a first surface layer comprising a cross-linked, partially neutralized copolymer of ethylene and one or more $\alpha,\beta$-unsaturated $C_3$ to $C_8$ carboxylic acid, and a second surface layer comprising a polyamide; a use of such multilayer film for, for example, decorating a substrate such as for example a ski, snowboard or skate board; as well as a ski comprising such coextruded multilayer film.

Furthermore, the invention provides for a process for decorating a substrate such as for example a ski, snowboard or skateboard, comprising the steps of: coextruding a multilayer film comprising a first surface layer comprising a partially neutralized copolymer of ethylene and one or more, $\alpha,\beta$ unsaturated $C_3$ to $C_8$ carboxylic acid and a second surface layer comprising a polyamide; irradiating the coextruded multilayer film to cross-link the film; printing a decorative element on the second surface layer comprising a polyamide; cutting the multilayer film; contacting the second surface layer of the multilayer film with a surface to be decorated on a substrate; laminating, e.g., by heat, the multilayer film to the surface to be decorated.

DETAILED DESCRIPTION

The multilayer film is preferably co-extruded.

The coextruded multilayer film comprising, or consisting of, a first surface layer comprising, or consisting of, a cross-linked, partially neutralized copolymer of ethylene and one or more $\alpha,\beta$ unsaturated $C_3$ to $C_8$ carboxylic acid, and a second surface layer comprising a polyamide can be obtained by extruding a layer comprising, or consisting of, a partially neutralized copolymer of ethylene and one or more $\alpha,\beta$-unsaturated $C_3$ to $C_8$ carboxylic acid together with a layer comprising a polyamide, and subsequently cross-linking the obtained multilayer film by ionizing radiation.

The cross-linking of the partially neutralized copolymer of ethylene and one or more $\alpha,\beta$ unsaturated $C_3$ to $C_8$ carboxylic acid increases the resistance of the copolymer against scratch and scuff marks but at the same time makes decreases its ability to be heat laminated to a substrate.

The first surface layer of the coextruded multilayer film comprises a cross-linked, partially neutralized copolymer of ethylene and one or more $\alpha,\beta$ unsaturated $C_3$ to $C_8$ carboxylic acid, which may have a thickness of from 100 to 2000 µm, preferably of from 200 to 1000 µm, and more preferably of from 300 to 700 µm.

The cross-linked, partially neutralized copolymer of ethylene and one or more $\alpha,\beta$ unsaturated $C_3$ to $C_8$ carboxylic acid may be obtained by cross-linking a partially neutralized copolymer of ethylene and one or more $\alpha,\beta$-unsaturated $C_3$ to $C_8$ carboxylic acid using a non-thermal curing method, such as for example cross-linking with ionizing radiation such as e-beam. Suitable ionizing radiation may be in the form of high energy electrons, X-rays, UV radiation or gamma rays.

The non-thermal curing method may be carried out in batch-wise fashion or in a continuous fashion, and is preferably carried out in a continuous fashion. For example, the coextruded multilayer film may be conveyed continuously through a non-thermal, ionizing radiation cross-linking device on rolls.

The dose of radiation necessary to cross-link the partially neutralized copolymer of ethylene and one or more $\alpha,\beta$ unsaturated $C_3$ to $C_8$ carboxylic acid may be of from 50 to 300 kGy, and more preferably of from 100 to 200 kGy.

The one or more unsaturated $C_3$ to $C_8$ carboxylic acid comprised in the partially neutralized copolymer of ethylene and one or more, $\alpha,\beta$ unsaturated $C_3$ to $C_8$ carboxylic acid may preferably be chosen from acrylic acid and methacrylic acid.

The partially neutralized copolymer of ethylene and one or more, $\alpha,\beta$-unsaturated $C_3$ to $C_8$ carboxylic acid may further optionally contain a third, so-called "softening" comonomer. This "softening" comonomer decreases the crystallinity of the partially neutralized copolymer of ethylene and one or more, α,β-unsaturated $C_3$ to $C_8$ carboxylic acid. Suitable "softening" comonomers may be chosen from $C_1$ to $C_8$ alkyl acrylates and $C_1$ to $C_8$ alkyl methacrylates.

The partially neutralized copolymer of ethylene and one or more α,β unsaturated $C_3$ to $C_8$ carboxylic acid comprised in the first surface layer can thus be described as an E/X/Y copolymer, wherein E represents copolymerized units of ethylene, X represents copolymerized units of the one or more α,β unsaturated $C_3$ to $C_8$ carboxylic acid, and Y represents copolymerized units of the "softening" comonomer.

In the partially neutralized copolymer of ethylene and one or more α,β unsaturated $C_3$ to $C_8$ carboxylic acid the amount of X may be of from 1 to 20 weight percent, preferably of from 9 to 20 weight percent, more preferably of from 12 to 15 weight percent, based on the total weight of the partially neutralized copolymer. The amount of Y may be of from 0 to about 30 weight percent, based on the total weight of the partially neutralized copolymer. The remainder of the partially neutralized copolymer comprises or consists essentially of partially neutralized copolymerized residues of ethylene.

Preferably, the amount of Y in the partially neutralized copolymer is 0%, based on the total weight of the partially neutralized copolymer, i.e. the partially neutralized copolymer of ethylene and one or more α,β unsaturated $C_3$ to $C_8$ carboxylic acid is an E/X dipolymer that consist essentially of copolymerized residues of ethylene and one or more α,β unsaturated $C_3$ to $C_8$ carboxylic acid.

In addition, the partially neutralized copolymer of ethylene and one or more α,β unsaturated $C_3$ to $C_8$ carboxylic acid has a melt flow index of from 0.1 to 150 g/10 min, 0.1 to 50 g/10 min, 0.1 to 15 g/10 min, 0.2 to 5 g/10 min, or 0.5 to 2.5 g/10 min, as measured by ASTM D1238 at a temperature of 190° C. when using a weight of 2.16 kg.

Finally, methods of preparing partially neutralized copolymers of ethylene and one or more α,β unsaturated $C_3$ to $C_8$ carboxylic acid are well known to one skilled in the art and the description of which is omitted for the interest of brevity.

The term "partially neutralized copolymers" refers to copolymers in which at least some of the carboxylic acid groups of the α,β unsaturated $C_3$ to $C_8$ carboxylic acid residues are neutralized to form the corresponding carboxylate salts. The level of neutralization can be from 1.0 to 99.9 equivalent percent, from 20 to 75 equivalent percent, or from 40 to 75 equivalent percent.

Compounds suitable for neutralizing the carboxylic groups of the copolymer include ionic compounds having basic anions and alkali metal cations (for example, lithium or sodium or potassium ions), transition metal cations (for example, zinc ion), or alkaline earth metal cations (for example magnesium or calcium ions) and mixtures or combinations of such cations.

Ionic compounds that may be used for obtaining the partially neutralized copolymer include alkali metal formates, acetates, nitrates, carbonates, hydrogen carbonates, oxides, hydroxides or alkoxides. Other useful ionic compounds include alkaline earth metal formates, acetates, nitrates, oxides, hydroxides or alkoxides of alkaline earth metals. Transition metal formates, acetates, nitrates, carbonates, hydrogen carbonates, oxides, hydroxides or alkoxides may also be used. Preferred neutralizing agents are sources of sodium ions, potassium ions, zinc ions, magnesium ions, lithium ions, transition metal ions, alkaline earth metal cations and combinations of two or more thereof.

For example, the neutralizing agent is a source of zinc ions.

The partially neutralized copolymers are also known as "ionomer".

Ionomers and methods of manufacturing ionomers are described further in U.S. Pat. No. 3,264,272, for example.

The second surface layer of the coextruded multilayer film comprises, or consists of, a polyamide or other suitable polymers that do not lose their ability to flow when heated and when irradiated with ionizing radiation. Suitable polyamides may be chosen from semi-aromatic, aliphatic polyamides, and blends thereof having a melting temperature of from 150 to 330° C.

The second surface layer of the coextruded multilayer film comprising a polyamide may have a thickness of from 50 to 500 μm, preferably of from 50 to 250 μm, and more preferably of from 50 to 150 μm.

The polyamide comprised in the second surface layer of the coextruded multilayer film may be a fully aliphatic polyamide. Fully aliphatic polyamide resins may be formed from aliphatic and alicyclic monomers such as diamines, dicarboxylic acids, lactams, aminocarboxylic acids, and their reactive equivalents. A suitable aminocarboxylic acid includes 11-aminododecanoic acid. In the context of this invention, the term "fully aliphatic polyamide resin" also refers to copolymers derived from two or more such monomers and blends of two or more fully aliphatic polyamide resins. Linear, branched, and cyclic monomers may be used.

Carboxylic acid monomers comprised in fully aliphatic polyamide resins may include, but are not limited to, aliphatic carboxylic acids, such as for example adipic acid (C6), pimelic acid (C7), suberic acid (C8), azelaic acid (C9), sebacic acid (C10), dodecanedioic acid (C12) and tetradecanedioic acid (C14). Diamines can be chosen among diamines having four or more carbon atoms, including, but not limited to tetramethylene diamine, hexamethylene diamine, octamethylene diamine, decamethylene diamine, 2-methylpentamethylene diamine, 2-ethyltetramethylene diamine, 2-methyloctamethylene diamine; trimethylhexamethylene diamine and/or mixtures thereof. Suitable examples of fully aliphatic polyamide resins include PA6; PA6,6; PA4,6; PA6,10; PA6,12; PA6,14; P 6,13; PA 6,15; PA6,16; PA11; PA 12; PA10; PA 9,12; PA9,13; PA9,14; PA9,15; P 6,16; PA9,36; PA10,10; PA10,12; PA10,13; PA10,14; PA12, 10; PA12,12; PA12,13; 12,14 and copolymers and blends of the same.

Preferred examples of fully aliphatic polyamide resins comprised in the polyamide composition described herein include PA6, PA11, PAl2, PA4,6, PA6,6, PA,10; PA6,12; PA10,10 and copolymers and blends of the same.

In one embodiment, in the coextruded multilayer film, the first surface layer may further be subdivided into, i.e. comprise, consist essentially of, or consist of, an external layer comprising a polyamide and an internal layer comprising the cross-linked, partially neutralized copolymer of ethylene and one or more α,β unsaturated $C_3$ to $C_8$ carboxylic acid the layer being adjacent to the external layer of the first surface layer.

The external layer of the first surface layer forms the surface of the first surface layer in the coextruded multilayer film of the present invention.

The external layer of the first surface layer comprises a polyamide, and may comprise a polyamide chosen from semi-aromatic, aliphatic polyamides, and blends thereof having a melting temperature of from 150 to 330° C.

The external layer of the first surface layer may have a thickness of from 5 to 200 µm, 5 to 100 µm, 5 to 50 µm, or 5 to 15 µm.

The internal layer comprising the cross-linked, partially neutralized copolymer of ethylene and one or more α,β unsaturated $C_3$ to $C_8$ carboxylic acid said layer is adjacent to the external layer of the first surface layer, i.e. is located beneath the external layer.

In still another embodiment, in the coextruded multilayer film, the second surface layer may further be subdivided into, i.e., comprise, consist essentially of, or consist of, an external layer comprising a grafted polypropylene or grafted copolymer of propylene and one or more α-olefin, and an internal layer comprising the polyamide, said layer being adjacent to the external layer of the second surface layer.

The external layer of the second surface layer forms the surface of the second surface layer in the coextruded multilayer film of the present invention.

The external layer may comprise a grafted polypropylene or grafted copolymer of propylene and one or more alpha olefin.

The grafted polypropylene and grafted copolymer of propylene and one or more alpha olefin may be obtained by modifying said polymers in a known kind of way, meaning that the polymers are grafted and/or copolymerized with organic functionalities. The polymers of the external layer of the second surface layer may be modified with acid, anhydride and/or epoxide functionalities. Examples of the acids and anhydrides used to modify polymers are mono-, di- or polycarboxylic acids such as acrylic acid, methacrylic acid, maleic acid, maleic acid monoethylester, fumaric acid, fumaric acid, itaconic acid, crotonic acid, itaconic anhydride, maleic anhydride and substituted maleic anhydride, e.g. dimethyl maleic anhydride or citrotonic anhydride, nadic anhydride, nadic methyl anhydride, and tetrahydrophthalic anhydride, or combinations of two or more thereof, with maleic anhydride being preferred.

The grafted polypropylene and grafted copolymer of propylene and one or more alpha olefin may contain of from 0.05 to 25 weight percent of an acid, the weight percentage being based on the total weight of the modified grafted polymer.

The grafted polypropylene or grafted copolymer of propylene and one or more alpha olefin may have a melt flow index of from 1 to 20 g/10 min, preferably from 2 to 10 g/10 min, and more preferably from 2 to 8 g/10 min, as measured by ASTM D1238 at a temperature of 190° C. when using a weight of 2.16 kg.

The internal layer comprising the polyamide is adjacent to the external layer of the second surface layer.

An article comprises, consists essentially of, or consists of a surface layer and a substrate wherein the surface layer can be the same as that disclosed above and the substrate can be the same as disclosed above such as ski, snowboard, or skateboard.

The invention further provides a process for decorating a substrate, comprising the steps of:

a) coextruding a multilayer film comprising a first surface layer comprising a cross-linkable partially neutralized copolymer of ethylene and one or more α,β unsaturated $C_3$ to $C_8$ carboxylic acid and a second surface layer comprising a polyamide;

b) irradiating said coextruded multilayer film to cross-link the film;

c) printing a decorative element on the second surface layer comprising a polyamide;

d) cutting the multilayer film;

e) contacting the second surface layer of the multilayer film with a surface to be decorated on a substrate such as for example a ski, snowboard or skateboard;

f) contacting the multilayer film to the surface to be decorated wherein the contacting can be laminating, attaching, or coating.

For example, the contacting can be carried out by heat laminating.

The substrate to be decorated with the coextruded multilayer film of the present invention may be chosen among wood panels, metal sheets, polymeric substrates or sports articles that can be obtained by heat lamination of various layers or parts to form a decorated articles such as for example a ski, snowboard or skateboard or furniture elements.

The decorated articles comprise a substrate and a coextruded multilayer film according to the present invention heat-laminated to them, wherein the second surface layer of the coextruded multilayer film is in contact with the substrate.

Coextruding a multilayer film comprising a first surface layer comprising a cross-linkable partially neutralized copolymer of ethylene and one or more α,β unsaturated $C_3$ to $C_8$ carboxylic acid and a second surface layer comprising a polyamide may be achieved by extruding a layer comprising a partially neutralized copolymer of ethylene and one or more α,β unsaturated $C_3$ to $C_8$ carboxylic acid together with a layer comprising a polyamide or by extruding a layer of cross-linkable, partially neutralized copolymer of ethylene and one or more α,β unsaturated $C_3$ to $C_8$ carboxylic acid onto a layer comprising a polyamide, the extrusion of the layer comprising a partially neutralized copolymer of ethylene and one or more α,β unsaturated $C_3$ to $C_8$ carboxylic acid together with the layer comprising a polyamide being preferred.

Irradiating the coextruded multilayer film to cross-link the film may be achieved by exposing the coextruded multilayer film to a source of ionizing radiation such as for example, gamma ray, UV radiation, X-ray or high energy electrons. The radiation dose delivered by the source may be in the range of from 50 to 300 kGy, and more preferably of from 100 to 200 kGy. In the case where the coextruded multilayer film comprises an external layer comprising a grafted polypropylene or grafted copolymer of propylene and one or more alpha olefin, the irradiation of the external layer reduces the viscosity of the grafted polypropylene or grafted copolymer of propylene, and thereby enhances the wetting of the substrate during the ensuing heat lamination step to yield better adhesion.

Printing a decorative element on the second surface layer comprising a polyamide may be achieved, for example, by known methods of printing such as sublimation printing. The printing step may optionally be carried out in-line with the cross-linking of the multilayer film.

Cutting the multilayer film may be achieved by for example manual cutting, stamping, die cutting or laser cutting the cross-linked, multilayer film. The shape of the cut is determined by the object to be decorated.

Contacting the second surface layer of the multilayer film with a surface to be decorated on a substrate such as for example a ski, snowboard or skateboard can be achieved manually or by a placer robot.

Heat laminating the multilayer film to the surface to be decorated on the substrate such as for example a ski, snowboard or skateboard may be achieved by pressing the multilayer film against the surface to be decorated with a pressure of from 5 to 100 bar, or from 5 to 50 bar, or from 8 to 15 bar, and heating the multilayer film and the surface to be decorated to a temperature of from 80 to 330° C., or from 100 to 250° C., or from 10 to 180° C.

An additive usually known and used by one skilled in the art can be used in, mixed with, or combined with any one layer or the substrate disclosed above. Such additive can be present in the-layer or substrate from about 0.0001 to about 20%, 0.001 to 10%, or 0.01 to 5%, based on the weight of the layer or the substrate. Examples of the additive can include plasticizers, processing aids, flow enhancing additives, lubricants, pigments, dyes, flame retardants, impact modifiers, nucleating agents to increase crystallinity, anti-blocking agents such as silica, thermal stabilizers, UV absorbers, UV stabilizers, dispersants, surfactants, chelating agents, coupling agents, adhesives, primers, antistatic agents, slip agents, crosslinking agents and the like. For example, the first layer can be a clear layer and the second layer can comprise a pigment. The physical properties of each of such layers or substrate can also comprise one or fillers known to one skilled in the art.

EXAMPLES

The following materials were used for preparing the multilayer films according to the present invention:
SURLYN® S: a partially neutralized copolymer of ethylene and one or more α,β unsaturated C3 to C8 carboxylic acid
PA 12: Rilsan AESNO TL (from Arkema)
BYNEL® A: a grafted polyethylene or grafted copolymer of polyethylene and one or more alpha olefin
BYNEL® B: a grafted polypropylene or grafted copolymer of propylene and one or more alpha olefin
PA 6: Grilon F34 (from EMS)

Example 1 (E1)

A multilayer film was first prepared by co-extruding the SURLYN® S and the PA 12. This film was then irradiated by electron beam at a dose of 100 kGy. The final samples were obtained by cutting small strips of 70×15×0.6 mm from the non-irradiated and irradiated films.

The samples of the non-irradiated and irradiated films were welded onto 70×15×0.1 mm BYNEL® A samples. After welding, pealing tests were conducted according to ASTM D903.

Results are shown in Table 1. As shown in Table 1, adhesion of the multilayer film onto the BYNEL® A sample is not affected by irradiation.

TABLE 1

|  | Fmoy N | Fmax N |
| --- | --- | --- |
| Non irradiated sample | 23.6 | 30.8 |
| 100 kGy irradiated sample | 30.1 | 37.0 |

Example 2 (E2)

A multilayer film was prepared by co-extruding the SURLYN® S, the PA 6 and the BYNEL® B. Different films of this same structure were irradiated at different doses: 75 kGy and 100 kGy.

The final samples were obtained by cutting small strips of 70×15×0.1 mm from the non-irradiated and irradiated films.

The samples of the non-irradiated and irradiated films were welded onto 70×15×0.5 mm aluminum samples. After welding, pealing tests were conducted according to ASTM D903.

Results are shown in Table 2. As indicated in Table 2, irradiation does not have a significant effect on delamination strength. BYNEL® B, even exposed to irradiation, will not cross-link and therefore keep its bonding performance.

TABLE 2

|  | F N | F/F(Non irradiated sample 1) % |
| --- | --- | --- |
| Non irradiated sample 1 | 8.63 | n/a |
| 75 kGy irradiated sample 2 | 9.73 | 12.7 |
| 100 kGy irradiated sample 3 | 9.61 | 11.3 |

Example 3 (E3)

A multilayer film was prepared by co-extruding the SURLYN® S, the PA 6 and the BYNEL® A. Different films of this same structure were irradiated at different doses: 75 kGy and 100 kGy.

The final samples were obtained by cutting small strips of 70×15×0.1 mm from the non-irradiated and irradiated films.

The samples of the non-irradiated and irradiated films were welded onto 70×15×0.5 mm aluminum samples. After welding, pealing tests were conducted according to ASTM D903.

Results are shown in Table 3. As indicated in Table 3, irradiation has a significant effect on delamination strength. The grafted polyethylene or grafted copolymer of polyethylene and one or more alpha olefin cross-links with irradiation and loses its bonding performance.

TABLE 3

|  | F N | F/F (Non irradiated sample 4) % |
| --- | --- | --- |
| Non irradiated sample 4 | 13.36 | n/a |
| 75 kGy irradiated sample 5 | 8.50 | −36.4 |
| 100 kGy irradiated sample 6 | 7.89 | −41.0 |

Example 4 (E4)

A multilayer film was first prepared by co-extruding the SURLYN® S and the PA 12. Different films of this same structure were irradiated at different doses: 100 kGy, 150 kGy and 200 kGy.

The final structure of the samples consisted in 150×50×0.6 mm sheets.

Scratch resistance of the non-irradiated and irradiated films were measured using an Eirichsen tester according to ISO1518 where a weight between 0.1 and 2 kg was applied onto a needle which was drawn over the polymer surface. The scratch was conducted on the SURLYN® S side of the multilayer film. This apparatus measured the weight in Newton at which a scratch mark was visible on the surface.

Results are shown in Table 4. As shown in Table 4, the irradiated samples show a slightly better scratch resistance. For comparison, an applied force of 10N is sufficient to produce a visible scratch mark on the non-irradiated sample 7, compared to an applied force of 12N for sample 8, 9 or 10.

TABLE 4

|  | Non-irradiated sample 7 | 100 kGy irradiated sample 8 | 150 kGy irradiated sample 9 | 200 kGy irradiated sample 10 |
|---|---|---|---|---|
| Scratch resistance with 1 mm needle (N) | 10 | 12 | 12 | 12 |

The invention claimed is:

1. A coextruded multilayer film comprising a first surface layer and a second surface layer wherein:
   the first surface layer consisting of a cross-linked, non-weldable, partially neutralized copolymer of ethylene and one or more α,β-unsaturated $C_3$ to $C_8$ carboxylic acid and optionally, from 0.001 to 10 wt. % of a plasticizer, processing aid, flow enhancing additive, lubricant, pigment, dye, flame retardant, impact modifier, nucleating agent, antiblocking agent, thermal stabilizer, UV absorber, UB stabilizer, dispersant, surfactant, chelating agent, coupling agent, adhesive, primer, antistatic agent, crosslinking agent, or slip agent; and
   the second surface layer comprises an internal layer comprising a polyamide and an external layer, the external layer consisting of:
   (i) a grafted propylene or a grafted copolymer of propylene and one or more α-olefin; and
   (ii) optionally, from 0.001 to 10 wt. % of a plasticizer, processing aid, flow enhancing additive, lubricant, pigment, dye, flame retardant, impact modifier, nucleating agent, antiblocking agent, thermal stabilizer, UV absorber, UV stabilizer, dispersant, surfactant, chelating agent, coupling agent, adhesive, primer, antistatic agent, crosslinking agent, or slip agent.

2. The multilayer film of claim 1 wherein the multilayer is a co-extruded multilayer; and the polyamide is selected from the group consisting of polyamide 10, polyamide 11, polyamide 12, polyamide 6, polyamide 6.6, polyamide 6,10, or combinations of two or more thereof.

3. The multilayer film according to claim 2 wherein the polyamide has a melt flow index, when measured according to ASTM D1238, of from 0.1 to 15 g/10 min at a temperature of 235° C. when using a weight of 2.16 kg.

4. The use of a multilayer film of claim 3 for decorating a substrate.

5. The use according to claim 4 wherein the substrate is a ski, snowboard, or skateboard.

6. An article comprising a substrate having laminated, attached, or coated, thereto a second surface of a multilayer film according to claim 1.

7. The article of claim 6 wherein the substrate is a ski, snowboard or skateboard.

8. An article comprising a substrate having laminated, attached, or coated, thereto a second surface of a multilayer film according to claim 3.

9. The process article of claim 8 wherein the substrate is a ski, snowboard, or skateboard.

* * * * *